US010537993B2

(12) United States Patent
Ulliman et al.

(10) Patent No.: US 10,537,993 B2
(45) Date of Patent: Jan. 21, 2020

(54) APPARATUS AND METHOD FOR SURFACE FINISHING

(71) Applicants: Matthew S. Ulliman, Dayton, OH (US); Jeff Martin, Troy, OH (US)

(72) Inventors: Matthew S. Ulliman, Dayton, OH (US); Jeff Martin, Troy, OH (US)

(*) Notice: Subject to any disclaimer, the term of this patent is extended or adjusted under 35 U.S.C. 154(b) by 4 days.

(21) Appl. No.: 15/679,472

(22) Filed: Aug. 17, 2017

(65) Prior Publication Data
US 2019/0054615 A1    Feb. 21, 2019

(51) Int. Cl.
| | | |
|---|---|---|
| *B25J 11/00* | (2006.01) | |
| *B25J 17/02* | (2006.01) | |
| *B25J 5/00* | (2006.01) | |
| *B24B 7/18* | (2006.01) | |
| *B25J 9/10* | (2006.01) | |
| *B24D 7/02* | (2006.01) | |
| *B24B 23/00* | (2006.01) | |
| *B24B 27/00* | (2006.01) | |
| *B24B 23/02* | (2006.01) | |
| *B24B 55/10* | (2006.01) | |
| *B24D 7/10* | (2006.01) | |
| *B24B 49/12* | (2006.01) | |
| *B24D 7/16* | (2006.01) | |
| *B66F 11/04* | (2006.01) | |

(52) U.S. Cl.
CPC .............. *B25J 9/106* (2013.01); *B24B 7/186* (2013.01); *B24B 23/005* (2013.01); *B24B 23/028* (2013.01); *B24B 27/0007* (2013.01); *B24B 27/0038* (2013.01); *B24B 27/0084* (2013.01); *B24B 49/12* (2013.01); *B24B 55/102* (2013.01); *B24D 7/02* (2013.01); *B24D 7/10* (2013.01); *B25J 5/00* (2013.01); *B25J 11/00* (2013.01); *B25J 11/0065* (2013.01); *B25J 17/02* (2013.01); *B25J 17/0208* (2013.01); *B24B 7/18* (2013.01); *B24D 7/16* (2013.01); *B66F 11/044* (2013.01)

(58) Field of Classification Search
CPC ..... B25J 5/00; B25J 9/106; B25J 11/00; B25J 11/0065; B25J 17/0208; B25J 17/02; B24B 7/18
USPC .......................................................... 451/5
See application file for complete search history.

(56) References Cited

U.S. PATENT DOCUMENTS

| | | | |
|---|---|---|---|
| 3,275,965 A | 9/1966 | Knecht | |
| 4,496,279 A * | 1/1985 | Langer | B25J 9/046 414/729 |
| 4,518,307 A * | 5/1985 | Bloch | B25J 17/0208 414/729 |
| 4,547,929 A | 10/1985 | Lew et al. | |
| 4,775,029 A * | 10/1988 | MacDonald | B66F 11/046 182/2.1 |
| 4,884,941 A | 12/1989 | Kazerooni | |

(Continued)

*Primary Examiner* — Eileen P Morgan
(74) *Attorney, Agent, or Firm* — Walters & Wasylyna LLC

(57) ABSTRACT

An apparatus for surface finishing includes a robot and an end effector. The end effector includes a compliance wrist having an axis of movement and coupled to the robot and a grinder tool coupled to the compliance wrist. The robot is configured to controllably position the end effector in three-dimensional space. The compliance wrist is configured to bias the grinder tool to a biased position relative to the robot and enable the grinder tool to move relative to the robot in response to an external force acting upon the grinder tool.

20 Claims, 11 Drawing Sheets

(56) References Cited

U.S. PATENT DOCUMENTS

| | | | | |
|---|---|---|---|---|
| 4,904,148 A | * | 2/1990 | Larsson | B25J 9/04 |
| | | | | 414/680 |
| 5,299,389 A | * | 4/1994 | Yonaha | B25J 9/1684 |
| | | | | 451/11 |
| 5,497,061 A | * | 3/1996 | Nonaka | B25J 9/1633 |
| | | | | 318/568.1 |
| 5,711,697 A | * | 1/1998 | Taninaga | B24B 27/04 |
| | | | | 318/560 |
| 9,121,148 B2 | | 9/2015 | Johnson | |
| 9,636,827 B2 | * | 5/2017 | Sato | B25J 11/005 |
| 2005/0189168 A1 | | 9/2005 | Bean et al. | |
| 2010/0300230 A1 | * | 12/2010 | Helmer | B25J 9/106 |
| | | | | 74/469 |
| 2016/0089789 A1 | * | 3/2016 | Sato | B25J 11/005 |
| | | | | 700/254 |
| 2017/0341239 A1 | * | 11/2017 | Nakayama | B25J 19/0091 |

\* cited by examiner 10,537,993 B2

APPARATUS AND METHOD FOR SURFACE FINISHING

FIELD

The present disclosure is generally related to surface finishing operations and, more particularly, to apparatuses and methods for automatic grinding of a surface of a concrete structure.

BACKGROUND

Concrete structures (e.g., walls, ceilings, floors, beams, columns, etc.) are constructed using a formwork, which is erected for the purpose of allowing wet concrete to be retained and shaped into a desired shape and form. Once the concrete has set, the formwork is removed to expose the finished concrete structure. However, the placement and/or configuration of the formwork may create seams between adjoining sections of finished concrete. The seams protrude outward from the surface of the concrete structure and may extend approximately linearly along substantially an entire length of a joint between the adjoining sections. These seams may range in height between approximately one-eighth of an inch (0.3 cm) and approximately one-half inch (1.2 cm). Additionally, the height of the seam may vary along its length.

Due to various functional and/or aesthetic reasons, smoothing these seams, and other surface imperfections, may be needed. For example, seams may be ground substantially flush with a surrounding surface of the concrete structure to give the concrete a better surface finish. Surface finishing is often achieved by a dry grinding operation, in which grinding is performed without supplying water or some other liquid to the concrete surface and/or the tool. Typically, the grinding operation is performed manually with the use of a hand-held grinder tool, commonly referred to as an angle grinder or disc grinder, in which an abrasive disc of the grinder tool is pressed (e.g., at an angle or flat) against the seam and moved along the length of the seam. However, dry grinding generates large amounts of dust having a significant content of respirable size particles of silica (crystalline silica).

Breathing crystalline silica dust can cause silicosis, which in severe cases can be disabling or fatal. Moreover, crystalline silica has been classified as a human lung carcinogen. Due to the serious health hazards posed to workers by silica exposure, the Occupational Safety and Health Administration (OSHA) has an established the Permissible Exposure Limit (PEL), which limits the maximum amount of crystalline silica to which workers may be exposed during an 8-hour work shift to 50 micrograms per cubic meter of air. This new standard demonstrates a significant reduction in allowable silica exposure and requires measurement of the amount of silica exposure each day.

In addition to the PEL, other OSHA standards require operators performing tasks in which there is a risk of silica exposure to wear personal protective equipment (e.g., a respirator mask, gloves, safety glasses, hearing protection, etc.). Despite these precautions, during a concrete grinding operation, the operator may be subjected to various safety hazards including injury caused by projectiles (e.g., pieces of a shattered abrasive disc or shards of concrete), concentrated plums of silica dust, repetitive motion disorders, hearing loss and the like.

Accordingly, those skilled in the art continue with research and development efforts in the field of surface finishing concrete structures.

SUMMARY

In an example, the disclosed apparatus for surface finishing includes a robot and an end effector. The end effector includes a compliance wrist having an axis of movement and coupled to the robot and a grinder tool coupled to the compliance wrist. The robot is configured to controllably position the end effector in three-dimensional space. The compliance wrist is configured to bias the grinder tool to a biased position relative to the robot and enable the grinder tool to move relative to the robot in response to an external force acting upon the grinder tool.

In another example, the disclosed end effector includes a compliance wrist having an axis of movement and configured to be coupled to a robot. A grinder tool is configured to be coupled to the compliance wrist opposite the robot. The compliance wrist is configured to bias the grinder tool to a biased position relative to the robot and enable the grinder tool to move relative to the robot in response to an external force acting upon the grinder tool.

In an example, the disclosed method for surface finishing includes the steps of: (1) positioning, with a robot, a grinder tool in contact with a surface, wherein the grinder tool is coupled to the robot through a compliance wrist having an axis of movement; (2) moving, with the robot, the grinder tool along the surface to smooth the surface; (3) biasing, with the compliance wrist, the grinder tool to at least one of a pivotally biased position and a linearly biased position relative to the robot; and (4) with the compliance wrist, at least one of pivotally moving the grinder tool about the axis of movement relative to the robot and linearly moving the grinder tool along the axis of movement relative to the robot in response to the surface pushing against the grinder tool.

Other examples of the disclosed apparatus and method will become apparent from the following detailed description, the accompanying drawings and the appended claims.

DETAILED DESCRIPTION

Figure 1:
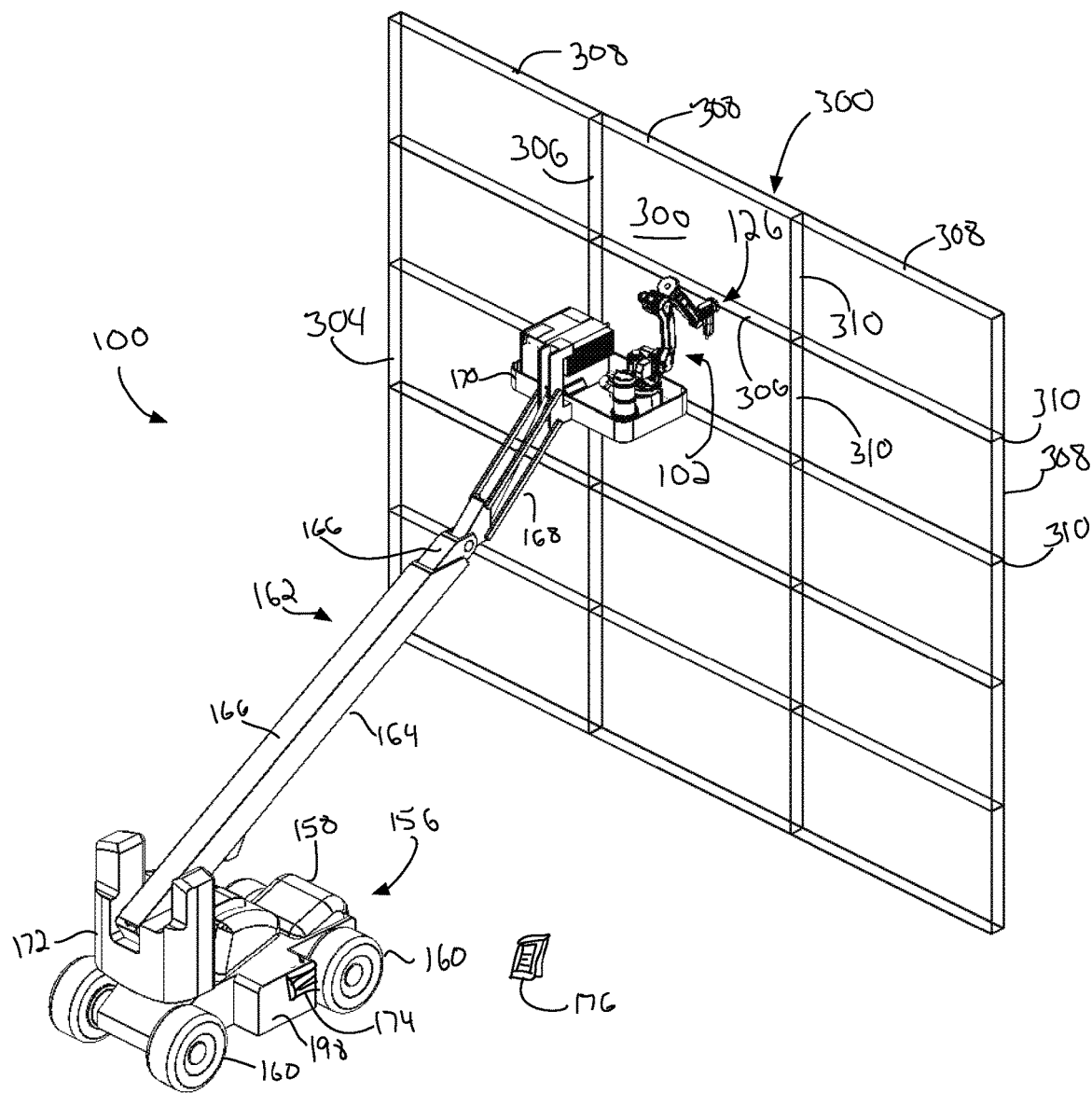
FIG. 1 is a schematic environmental perspective view of an example of the disclosed apparatus for surface finishing a concrete surface.

The following detailed description refers to the accompanying drawings, which illustrate specific examples and/or embodiments described by the present disclosure. Other examples and/or embodiments having different structures and operations do not depart from the scope of the present disclosure. Like reference numerals may refer to the same feature, element or component in the different drawings.

Illustrative, non-exhaustive examples, which may be, but are not necessarily, claimed, of the subject matter according the present disclosure are provided below.

Figure 2:
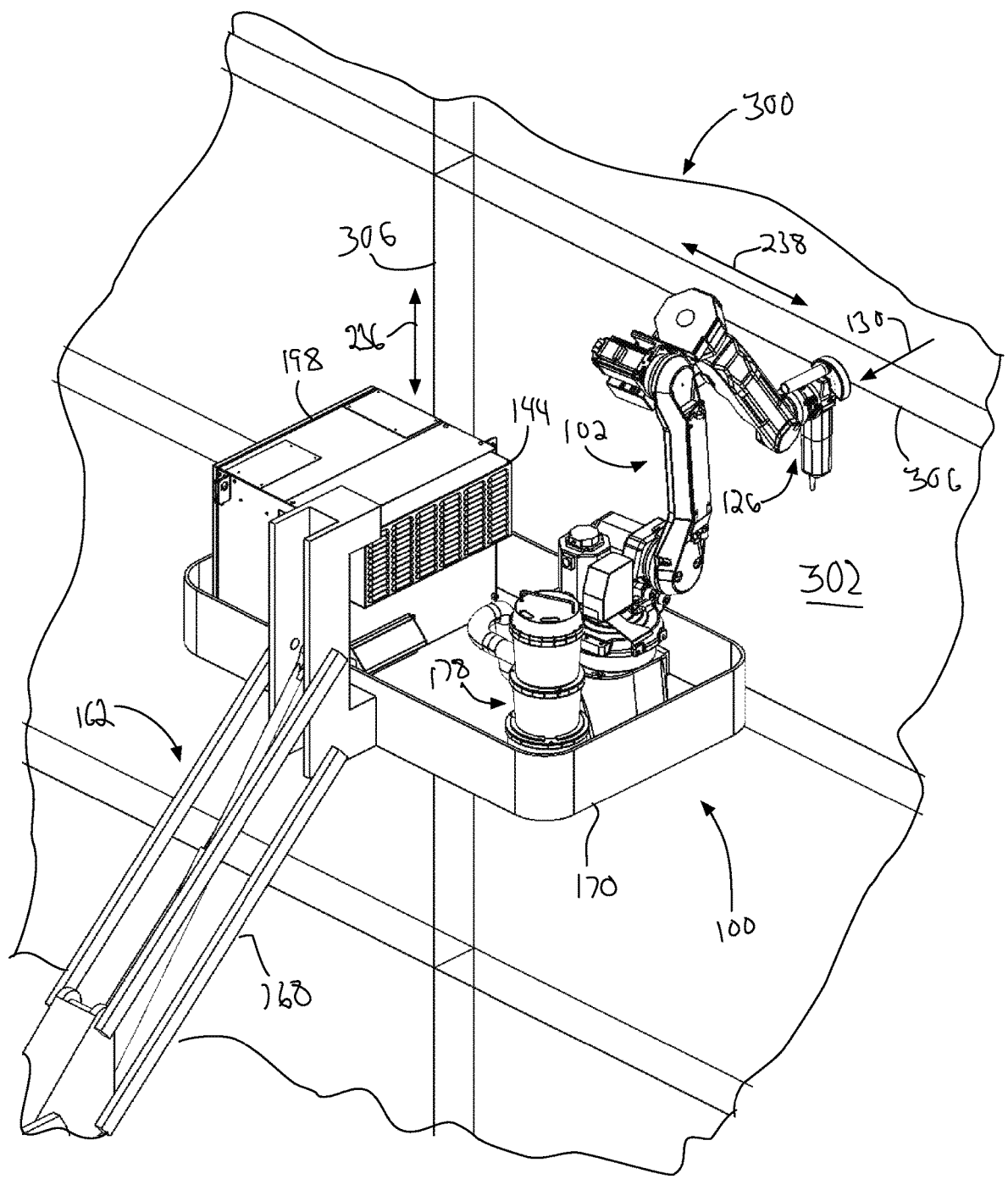
FIG. 2 is a schematic environmental perspective view of an example of the disclosed apparatus.

Referring to FIGS. 1 and 2, disclosed is an example of an apparatus 100 configured to perform one or more automated surface finishing operations. As a specific example, the apparatus 100 is configured to perform an automated surface finishing operation on an exterior, or otherwise exposed, surface 302 of a concrete structure 300 (also referred to herein generally as a concrete surface 302). An example of the automated surface finishing operation includes smoothing the concrete surface 302 utilizing the disclosed apparatus 100.

As an example, and as illustrated in FIG. 1, the concrete structure 300 may includes concrete wall 304. As other examples (not illustrated), the concrete structure 300 may include a concrete ceiling, a concrete floor, a concrete column or pillar, a concrete beam, and the like. Other concrete structures are also contemplated.

Due to the placement and/or configuration of formwork (not illustrated) used to construct the concrete structure 300, seams 306 or other protrusions may project outward from the concrete surface 302. For example, seams 306 may form between adjoining sections 308 of the concrete structure 300. The seams 306 may extend approximately linearly along substantially an entire length of a joint 310 between the adjoining sections 308. Other protrusions may include any surface imperfection that may be smoothed during the surface finishing operation.

The seams 306 may run in any direction. However, typically the seams 306 extend approximately horizontally and/or approximately vertically along the concrete surface 302. The seams 306 may range in height between approximately one-eighth (⅛) of an inch (0.3 cm) and approximately one-half (½) inch (1.2 cm). Additionally, the height of one or more of the seams 306 may vary along the length of the seam 306.

The disclosed apparatus 100 may be utilized to grind down, or grind out, the seam 306 such that the concrete surface 302 is substantially smooth. As an example, the seam 306 may be ground to be substantially flush with a portion of the concrete surface 302 surrounding the seam 306.

Figure 3:
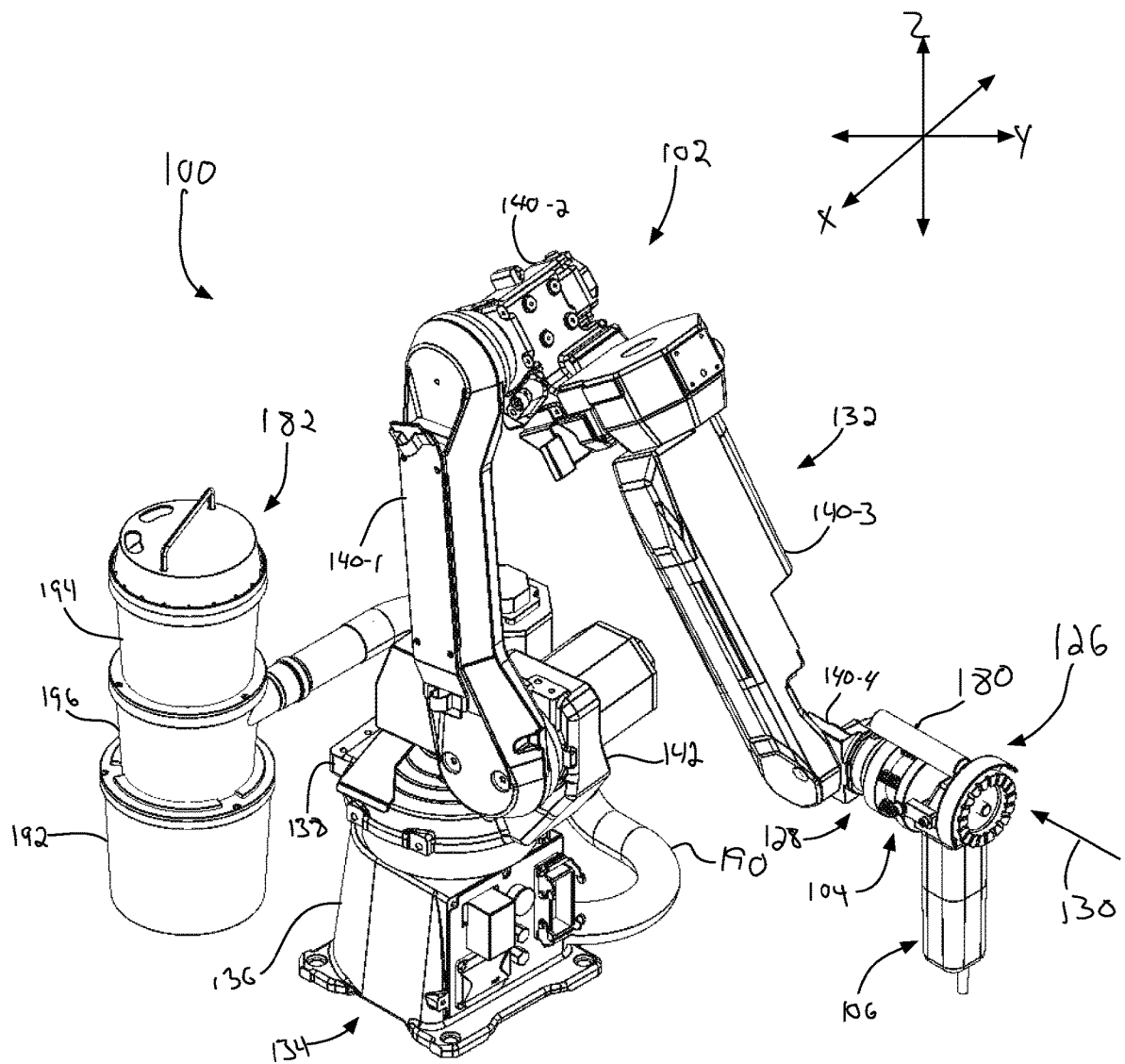
FIG. 3 is a schematic perspective view of an example of a robot of the disclosed apparatus of FIG. 1.

Referring to FIGS. 1-3, an example of the disclosed apparatus 100 includes a robot 102 and an end effector 126. The end effector 126 is coupled to an end 128 (e.g., the last link) of the robot 102. The robot 102 is configured to controllably move the end effector 126 in three-dimensional space (e.g., represented by a three-dimensional Cartesian coordinate system with an X-axis, a Y-axis, and a Z-axis). The end effector 126 is positionable by movement of the robot 102 within one or more degrees of freedom. The end effector 126 is configured to interact with the concrete structure 300 (FIGS. 1 and 2). As an example, the end effector 126 is configured to perform the surface finishing operation on the concrete surface 302 (FIGS. 1 and 2).

Figure 4:
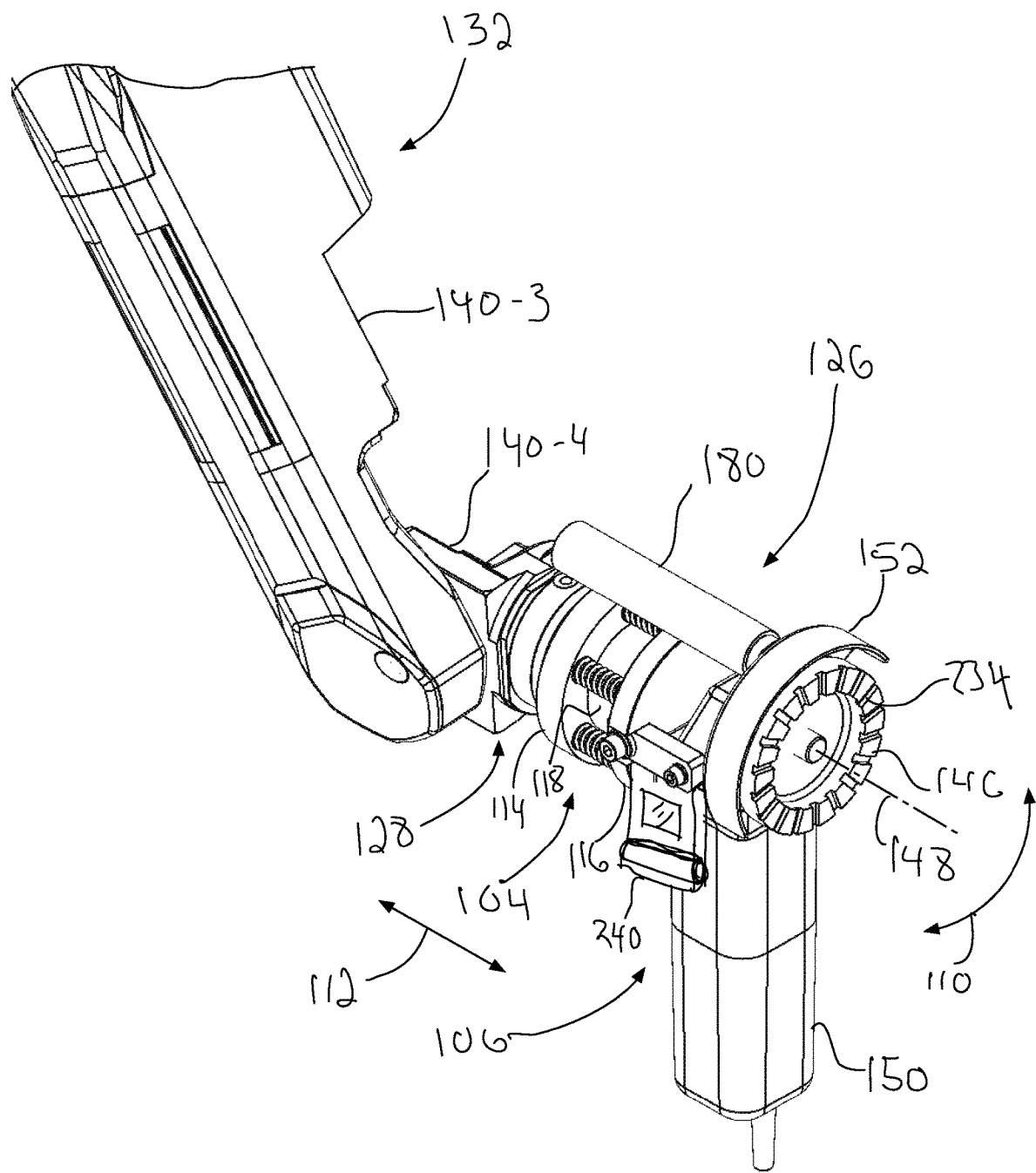
FIG. 4 is a schematic perspective view of an example of an end effector of the disclosed apparatus.
Figure 5:
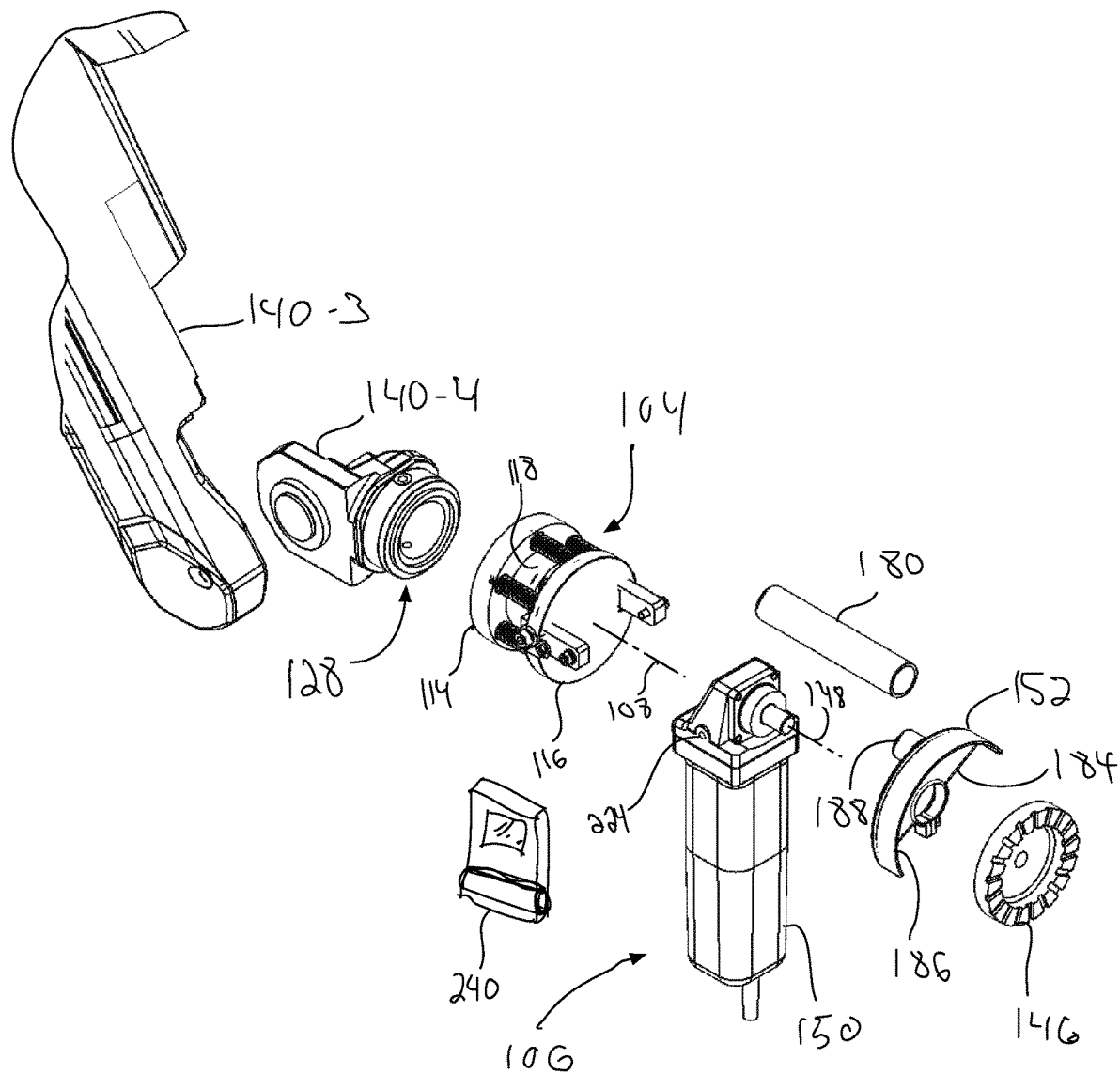
FIG. 5 is a schematic exploded perspective view of an example of the end effector of the disclosed apparatus.

Referring to FIGS. 4 and 5, in an example, the end effector 126 includes a compliance wrist 104 and a grinder tool 106. The compliance wrist 104 is coupled to the end 128 of the robot 102. The grinder tool 106 is coupled to the compliance wrist 104. The grinder tool 106 is positionable by movement of the robot 102 within one or more degrees of freedom. The grinder tool 106 is configured to interact with the concrete structure 300 (FIGS. 1 and 2). As an example, the grinder tool 106 is configured to perform the surface finishing operation on the concrete surface 302 (FIGS. 1 and 2).

The grinder tool 106 may be any power tool used for cutting, grinding and/or polishing. As an example, the grinder tool 106 is an angle grinder, also known as a side grinder or disc grinder. The grinder tool 106 may be selected from a variety of commercially available angle grinders.

The grinder tool 106 includes a surface finishing attachment 146 rotationally coupled to the grinder tool 106 at a right angle. The grinder tool 106 is capable of rotating the surface finishing attachment 146 about an axis of rotation 148 (FIG. 4) of the grinder tool 106. The surface finishing attachment 146 may be any attachment used for stripping, cleaning, deburring, sanding, grinding, cutting and/or polishing of a surface. As an example, the surface finishing attachment 146 is an abrasive disc. As other examples, the surface finishing attachment 146 is a cut-off disc, a brush (e.g., a wire brush), and the like.

The grinder tool 106 includes a drive mechanism 150. The drive mechanism 150 is operatively coupled to the surface finishing attachment 146 to rotate the surface finishing attachment 146 about the axis of rotation 148. The drive mechanism 150 may be configured to rotate the surface finishing attachment 146 at various speeds. The drive mechanism 150 may include various components common in the art, such as a drive motor, a geared drive head, a drive shaft, and the like, which are housed within an exterior housing. The grinder tool 106 (e.g., the drive mechanism 150) may be powered by an electric motor, compressed air, and the like.

The grinder tool 106 may also include a guard 152 (e.g., an adjustable guard) mounted to the exterior housing of the grinder tool 106 and positioned at least partially around the surface finishing attachment 146.

Referring to FIG. 3, in an example, the robot 102 is an articulated arm robot that is movable within a plurality of degrees of freedom (e.g., having at least five degrees of mechanically independent movement). As an example, the robot is moveable within at least three degrees of freedom. As another example, the robot is moveable within at least five degrees of freedom. As another example, the robot 102 is movable within at least six degrees of freedom. As yet another example, the robot 102 is movable within at least eight degrees of freedom.

In the illustrative examples, the robot 102 includes a base 134 and a multi-segment robotic arm assembly 132 mounted to the base 134 and moveable within a plurality of degrees of freedom. The base 134 provides support for the arm assembly 132. The end effector 126 is coupled to the end 128 of the arm assembly 132. The arm assembly 132 controllably moves the end effector 126 in three-dimensional space. The end effector 126 is positionable by movement of the base 134 and/or the arm assembly 132 within one or more degrees of freedom.

In an example, the base 134 is configured to rotate within a horizontal plane (e.g., defining a first degree of freedom). As an example, the base 134 includes a lower portion 136 that is configured to be fixed to a support surface 154 (FIG. 2) and an upper portion 138 that is rotatably coupled to the lower portion 136. In this example, the upper portion 138 is rotatable about a vertical axis relative to the lower portion 136.

In an example, the arm assembly 132 includes a plurality of arm segments 140. As an example, the arm assembly 132 includes a first arm segment 140-1 pivotally coupled (e.g., defining a second degree of freedom) to a shoulder 142 that is fixed to the base 134. A second arm segment 140-2 is pivotally coupled (e.g., defining a third degree of freedom) to a free end of the first arm segment 140-1. A third arm segment 140-3 is rotationally coupled (e.g., defining a fourth degree of freedom) to a free end of the second arm segment 140-2 and is capable of rotating (e.g., spinning) about a central axis (or centerline) of the third arm segment 140-3 relative to the second arm segment 140-2. A fourth arm segment 140-4 is pivotally coupled (e.g., defining a fifth degree of freedom) to a free end of the third arm segment 140-3. The end effector 126 is rotationally coupled (e.g., defining a sixth degree of freedom) to a free end of the fourth arm segment 140-4 and the fourth arm segment 140-4 is capable of rotating (e.g., spinning) the end effector 126 about a central axis (or centerline) of the fourth arm segment 140-4 relative to the fourth arm segment 140-4.

The arm segments 140 may be joined to each other via joints (not explicitly identified) that define the axes about which the arm segments 140 may pivot and/or rotate relative to each other. The robot 102 may also include a plurality of electric servomotors (not illustrated) actuating and controlling the movement of the base 134 and/or the various arm segments 140 of the arm assembly 132 described above. However, any other appropriate means for actuating the movements of the components of the robot 102, such as, for example, hydraulic motors or pneumatic motors may be utilized.

Referring to FIGS. 1 and 2, the robot 102 also includes a controller 144 that communicates with the robot 102. The controller 144 is configured to command the operation of the robot 102. During the surface finishing operation, the controller 144 directs the robot 102 so that the end effector 126 is moved through at least one predetermined set of movements with respect to the concrete surface 302 and/or the seam 306.

As an example, the predetermined set of movements at least positions the grinder tool 106 relative to the concrete surface 302 so that the surface finishing attachment 146 of the grinder tool 106 is in contact with the seam 306, holds the grinder tool 106 at that position so that the surface finishing attachment 146 of the grinder tool 106 grinds down the seam 306 at that location, and repositions (e.g., moves) the grinder tool 106 along a predetermined path (e.g., a linear path following the seam 306) so that the surface finishing attachment 146 of the grinder tool 106 grinds down the seam 306 at subsequent locations.

In an example, the controller 144 is also configured to control operation of the end effector 126. As an example, the controller 144 controls activation and deactivation of the grinder tool 106.

In an example, the controller 144 is fully programmable so as to be capable of actuating the robot 102 (e.g., the arm assembly 132 and/or the base 134) to move through a plurality of different predetermined sets of movements. Such controller programmability allows the disclosed apparatus 100 to be used with various concrete structures 302 having different sizes and/or shapes. As an example, the controller 144 is a standard control system provided with a commercially available robot 102. Alternatively, as another example, the controller 144 is a separately provided computing device, a programmable logic controller ("PLC"), or any other suitable programmable device operably connected with the robot 102 and/or with the end effecter 126 (e.g., the grinder tool 106).

The preceding description describes one approach to constructing and operating the robot 102. The robot 102 may be constructed and/or operated in other ways known within the field of robotics to achieve the movement needed to position, move and operate the end effector 126 (e.g., the grinder tool 106) in relation to the concrete surface 302. The robot 102 may be selected from a variety of commercially available articulated arm robots.

Referring still to FIGS. 1 and 2, in an example, the apparatus 100 also includes a boom lift vehicle 156. The boom lift vehicle 156 includes a vehicle base 158 and a boom assembly 162 movably coupled to the vehicle base 158. The vehicle base 158 is movably supported by a plurality of wheels 160. The vehicle base 158 also houses suitable drive components (e.g., a drive train and an engine) (not illustrated) mounted to a chassis of the vehicle base 158 and coupled with the wheels 160 for driving the boom lift vehicle 156. A counterweight may be fixed to the chassis of the vehicle base 158 to counterbalance and turning moments generated by the boom assembly 162.

In an example, the boom assembly 162 includes a tower boom 164 and a main boom 168. The tower boom 164 is pivotally coupled at a proximal end to the vehicle base 158. A suitable lifting mechanism (e.g., a hydraulic cylinder) (not illustrated) is coupled to the tower boom 164 and the vehicle base 158 and is configured to drive a position of the tower boom 164 relative to the vehicle base 158 and affect tower lift functions (e.g., to pivot (lift and lower) the tower boom 164 relative to the vehicle base 158).

In an example, the tower boom 164 includes telescoping segments 166 that are coupled with a suitable driving mechanism (not illustrated) that is configured to drive a position of the telescoping segments 166 relative to each other and affect telescope functions of the tower boom 164 (e.g., to extend and retract the telescoping segments 166). The tower boom 164 is shown including two telescoping segments, although those of ordinary skill in the art will appreciate that the tower boom 164 may include three or more telescoping segments 166.

In an example, a turntable 172 is rotationally coupled with the vehicle base 158. The tower boom 164 is pivotally coupled at the proximal end to the turntable 172. The turntable 172 is configured to enable rotation of the tower boom 164 about an axis of rotation relative to the vehicle base 158.

The main boom 168 is pivotally coupled at a proximal end to a distal end of the tower boom 164. A suitable lifting mechanism (e.g., a hydraulic cylinder) (not illustrated) is coupled to main boom 168 and the tower boom 164 and is configured to drive a position of the main boom 168 relative to the tower boom 164 and affect boom lift functions (e.g., to pivot (lift and lower) the main boom 168 relative to the tower boom 164).

In an example, the main boom 168 may also include telescope sections (not illustrated) coupled with a suitable driving mechanism (not illustrated) to affect telescope functions of the main boom 168.

A platform 170 is secured (e.g., fixed or pivotally coupled) to a distal end of the main boom 168. In the illustrative examples, the platform 170 serves as the support surface 154 for the robot 102 and the base 134 of the robot 102 is fixed to the platform 170.

The boom lift vehicle 156 also includes a control system 174 that communicates with the drive components of the vehicle base 158 and the lifting and driving mechanisms of the boom assembly 162. The control system 174 is configured to control at least one of the lift functions and/or telescope functions of the boom assembly 162, rotation of the turntable 172, and drive of the vehicle base 158 to control a position of the platform 170 and, thus, position of the robot 102 mounted on the platform 170, for example, to a predetermined position, prior to initiation of the surface finishing operation, and/or through a predetermined path, during the surface finishing operation, relative to the concrete surface 302.

In an example, the control system 174 is fully programmable so as to be capable of controlling movement of the vehicle base 158 and the boom assembly 162 through a plurality of different predetermined sets of movements. As an example, the control system 174 is a standard control system provided with a commercially available boom lift vehicle 156. Alternatively, as another example, the control system 174 is a separately provided computing device, a programmable logic controller ("PLC"), or any other suitable programmable device operably connected with the boom lift vehicle 156.

The apparatus 100 also includes an operator control 176 that communicates with the control system 174 of the boom lift vehicle 156 and the controller 144 of the robot 102. The operator control 176 is configured to provide input instructions to the control system 174 and/or the controller 144 to enable an operator to interact with and control the boom lift vehicle 156, the robot 102, and/or the end effector 126 (e.g., the grinder tool 106). As an example, the operator control 176 is a remote control communicatively coupled (e.g., wirelessly) with the control system 174 and/or the controller 144. As another example, the operator control 176 is a computing application (e.g., an "app") executed on a mobile computing device (e.g., a smartphone or tablet) that is communicatively coupled (e.g., wirelessly) with the control system 174 and/or the controller 144.

Referring to FIGS. 2-5, in an example, the apparatus 100 also includes a dust collector 178 (FIGS. 2 and 3) communicatively coupled with the grinder tool 106 (FIG. 3-5). The dust collector 178 is configured to collect dust and debris from the concrete surface 302 (FIG. 2) generated during the surface finishing operation. In an example, the dust collector 178 is communicatively coupled to the guard 152 (FIGS. 3-5) of the grinder tool 106 and includes a vacuum 182 (FIG. 3) configured to remove the dust and debris from within the guard 152 surrounding surface finishing attachment 146 of the grinder tool 106.

Referring to FIGS. 4 and 5, in an example, the guard 152 includes a body 184, which is of a generally U-shaped outline, including a rounded end having a shroud 186 that is approximately concentric with the axis of rotation 148 of the grinder tool 106 and at least partially surrounds the surface finishing attachment 146. The guard 152 includes a vacuum port 188 formed through the body 184. A duct 180 is communicatively coupled to the vacuum port 188 and is configured to be communicatively coupled to a vacuum hose 190 of the vacuum 182 (FIG. 3). Dust and/or debris created by the surface finishing operation accumulates within the body 184 and the shroud 186 of the guard 152 and is removed by the vacuum 182 that is communicatively coupled to the guard 152 through the duct 180 and the vacuum port 188.

Referring to FIG. 3, the vacuum 182 may be any suitable vacuum system capable of generating vacuum pressure sufficient to withdraw the dust and/or debris generated by the surface finishing operation from concrete surface 302 (FIG. 2). As an example, the vacuum 182 includes a vacuum source 192, a collection canister 194, and a filter 196. In an example, the filter 196 is configured to remove silica dust. The vacuum 182 may be selected from a variety of commercially available vacuum systems.

In an example, the controller 144 (FIG. 2) is also configured to control operation of the vacuum 182. As an example, the controller 144 controls activation and deactivation of the vacuum source 192.

Referring to FIGS. 1 and 2, in an example, the apparatus 100 also includes at least one power supply 198 operatively coupled with the robot 102, the grinder tool 106 of the end effector 126, and/or the vacuum 182. The power supply 198 may include one or more of an electrical power unit to supply electrical power), a pneumatic power unit to supply pneumatic power, or a hydraulic power unit to supply hydraulic power to the robot 102, the grinder tool 106 of the end effector 126, and/or the vacuum 182.

As an example, the boom lift vehicle 156 (FIG. 1) provides power to the robot 102, the grinder tool 106 of the end effector 126, and/or the vacuum 182 (e.g., includes the power supply 198). For example, the boom lift vehicle 156 may provide electricity to the robot 102, the grinder tool 106 of the end effector 126, and/or the vacuum 182. As another example, the power supply 198 is a standalone power unit (FIG. 2) that provides power to the robot 102, the grinder tool 106 of the end effector 126, and/or the vacuum 182.

Referring to FIGS. 3-5, in an example, the compliance wrist 104 is coupled to the end 128 of the fourth arm section 140-4. The grinder tool 106 is coupled to the compliance wrist 104. The compliance wrist 104 is configured to bias the grinder tool 106 to a biased position relative to the robot arm 102 when no external force is being applied to the grinder tool 106. The compliance wrist 104 is also configured to enable the grinder tool 106 to move relative to the robot arm 102 in response to an external force acting upon the grinder tool 106, represented by arrow 130 (FIGS. 2 and 3).

In an example, during the surface finishing operation, the boom lift vehicle 156 (FIG. 1) positions the robot 102 proximate to the concrete structure 300 (FIGS. 1 and 2). The robot 102 positions the end effector 126 relative to the concrete surface 302 (FIGS. 1 and 2). As an example, the robot 102 positions the grinder tool 106 in contact with the concrete surface 302 and/or the seam 306 (FIGS. 1 and 2) and moves the grinder tool 106 along the seam 306 to grind down the seam 306. In an example, the external force acting upon the grinder tool 106, represented by arrow 130 (FIGS. 2 and 3), is created in response to the concrete surface 302 and/or the seam 306 pushing back against the surface finishing attachment 146 of the grinder tool 106 when the surface finishing attachment 146 of the grinder tool 106 is positioned in contact with the concrete surface 302 and/or the seam 306 and/or is moved along the concrete surface 302 and/or the seam 306.

Referring to FIGS. 4 and 5, the compliance wrist 104 includes an axis of movement 108 (FIG. 5). In an example, the compliance wrist 104 is configured to pivotally bias the grinder tool 106 to a pivotally biased position about the axis of movement 108 relative to the robot 102. The compliance wrist 104 is also configured to enable the grinder tool 106 to pivotally move (pivot) about the axis of movement 108 relative to the robot 102 in response to the external force acting upon the grinder tool 106, for example, in the direction represented by directional arrow 110.

In an example, when the grinder tool 106 is in the pivotally biased position, the axis of rotation 148 of the grinder tool 106 is biased to an angular orientation relative to the robot 102 that is parallel with the axis of movement 108 of the compliance wrist 104. As an example, when the grinder tool 106 is in the pivotally biased position, the axis of rotation 148 of the grinder tool 106 is coaxial with the axis of movement 108 of the compliance wrist 104. In response to the external force, represented by arrow 130 (FIGS. 2 and 3), being applied to the surface finishing attachment 146 of the grinder tool 106 by the concrete surface 302 and/or the seam 306 of the concrete structure 300 (FIGS. 1 and 2), the grinder tool 106 pivots about the axis of movement 108 of the compliance wrist 104 so that the axis of rotation 148 of the grinder tool 106 has an angular orientation that is oblique to the axis of movement 108 of the compliance wrist 104.

In an example, the compliance wrist 104 is configured to linearly bias the grinder tool 106 to a linearly biased position along the axis of movement 108 relative to the robot 102. The compliance wrist 104 is also configured to enable the grinder tool 106 to linearly move (translate) along the axis of movement 108 relative to the robot 102 in response to the external force acting upon the grinder tool 106, for example, in the direction represented by directional arrow 112.

In an example, when the grinder tool 106 is in the linearly biased position, the grinder tool 106 is spaced away from the robot 102. In response to the external force being applied to the surface finishing attachment 146 of the grinder tool 106 by the concrete surface 302 and/or the seam 306 of the concrete structure 300 (FIGS. 1 and 2), the grinder tool 106 linearly moves along the axis of movement 108 of the compliance wrist 104 so that the grinder tool 106 is moved closer to the robot 102.

In an example, the compliance wrist 104 is configured to pivotally bias the grinder tool 106 to the pivotally biased position about the axis of movement 108 and to linearly bias the grinder tool 106 to the linearly biased position along the axis of movement 108 relative to the robot 102. The compliance wrist 104 is also configured to enable the grinder tool 106 to pivotally move about the axis of movement 108 relative to the robot 102 and to linearly move (translate) along the axis of movement 108 relative to the robot 102 in response to the external force acting upon the grinder tool 106.

Referring to FIGS. 6-10, in an example, the compliance wrist 104 includes a robot-mounting member 114, a tool-supporting member 116, and a movement assembly 118 movably coupling the tool-supporting member 116 with the robot-mounting member 114. The robot-mounting member 114 is configured to be coupled to the end 128 of the arm assembly 132 of the robot 102 (FIG. 4). The tool-supporting member 116 is configured for coupling of the grinder tool 106 to the tool-supporting member 116.

In an example, the movement assembly 118 is configured to pivotally bias the tool-supporting member 116 to a pivotally biased position about the axis of movement 108 relative to the robot-mounting member 114. The movement assembly 118 is also configured to enable the tool-supporting member 116 to pivotally move (pivot) about the axis of movement 108 relative to the robot-mounting member 114 in response to an external force acting upon the tool-supporting member 116, for example, in the direction represented by directional arrow 200.

In an example, the external force, represented by arrow 208, is created in response to the grinder tool 106 pushing against the tool-supporting member 116 when the surface finishing attachment 146 of the grinder tool 106 is positioned in contact with the concrete surface 302 and/or the seam 306 and/or is moved along the concrete surface 302 and/or the seam 306 (FIGS. 1 and 2).

In an example, the robot-mounting member 114 has a center axis 204 and the tool-supporting member 116 has a center axis 206. The center axis 204 of the robot-mounting member 114 is fixed at an angular orientation that is parallel with the axis of movement 108 of the compliance wrist 104. As an example, the center axis 204 of the robot-mounting member 114 is coaxial with the axis of movement 108 of the compliance wrist 104. When the tool-supporting member 116 is in the pivotally biased position, the center axis 206 of the tool-supporting member 116 is biased to an angular orientation that is parallel with the axis of movement 108 of the compliance wrist 104 and the center axis 204 of the robot-mounting member 114. As an example, when the tool-supporting member 116 is in the pivotally biased position, the center axis 206 of the tool-supporting member 116 is coaxial with the axis of movement 108 of the compliance wrist 104 and the center axis 204 of the robot-mounting member 114. Accordingly, the pivotally biased position of the tool-supporting member 116 corresponds to the pivotally biased position of the grinder tool 106. In response to the external force, represented by arrow 208, being applied to the tool-supporting member 116 of the compliance wrist 104 by the grinder tool 106, the tool-supporting member 116 pivots about the axis of movement 108 of the compliance wrist 104 so that the center axis 206 of the tool-supporting member 116 has an angular orientation that is oblique to the axis of movement 108 of the compliance wrist 104 and the center axis 204 of the robot-mounting member 114.

In an example, the movement assembly 118 is configured to linearly bias the tool-supporting member 116 to a linearly biased position about the along the axis of movement 108 relative to the robot-mounting member 114. The movement assembly 118 is also configured to enable the tool-supporting member 116 to linearly move (translate) along the axis of movement 108 relative to the robot-mounting member 114 in response to the external force acting upon the tool-supporting member 116, for example, in the direction represented by directional arrow 202.

In an example, when the tool-supporting member 116 is in the linearly biased position, the tool-supporting member 116 is spaced away from the robot-mounting member 114. Accordingly, the linearly biased position of the tool-supporting member 116 corresponds to the linearly biased position of the grinder tool 106. In response to the external force, represented by arrow 208, being applied to the tool-supporting member 116 of the compliance wrist 104 by the grinder tool 106, the tool-supporting member 116 linearly moves along the axis of movement 108 of the compliance wrist 104 so that the tool-supporting member 116 is moved closer to the robot-mounting member 114.

In an example, the movement assembly 118 is configured to pivotally bias the tool-supporting member 116 to the pivotally biased position about the axis of movement 108 and to linearly bias the tool-supporting member 116 to the linearly biased position along the axis of movement 108 relative to the robot-mounting member 114. The movement assembly 118 is also configured to enable the tool-supporting member 116 to pivotally move about the axis of movement 108 relative to the robot-mounting member 114 and to linearly move (translate) along the axis of movement 108 relative to the robot-mounting member 114 in response to the external force acting upon the grinder tool 106.

Figure 6:
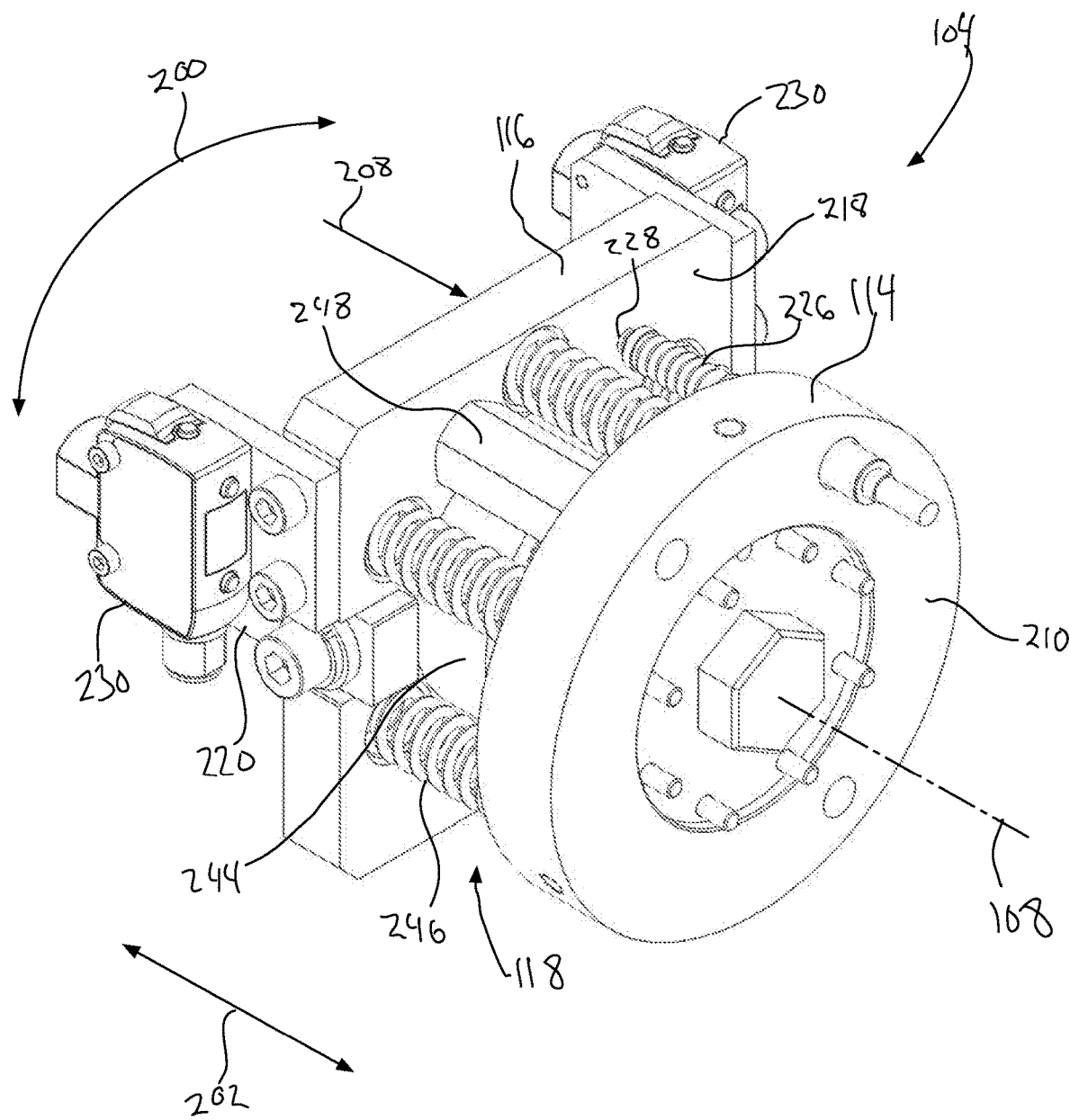
FIG. 6 is a schematic perspective end view of an example of a compliance wrist of the disclosed end effector.
Figure 7:
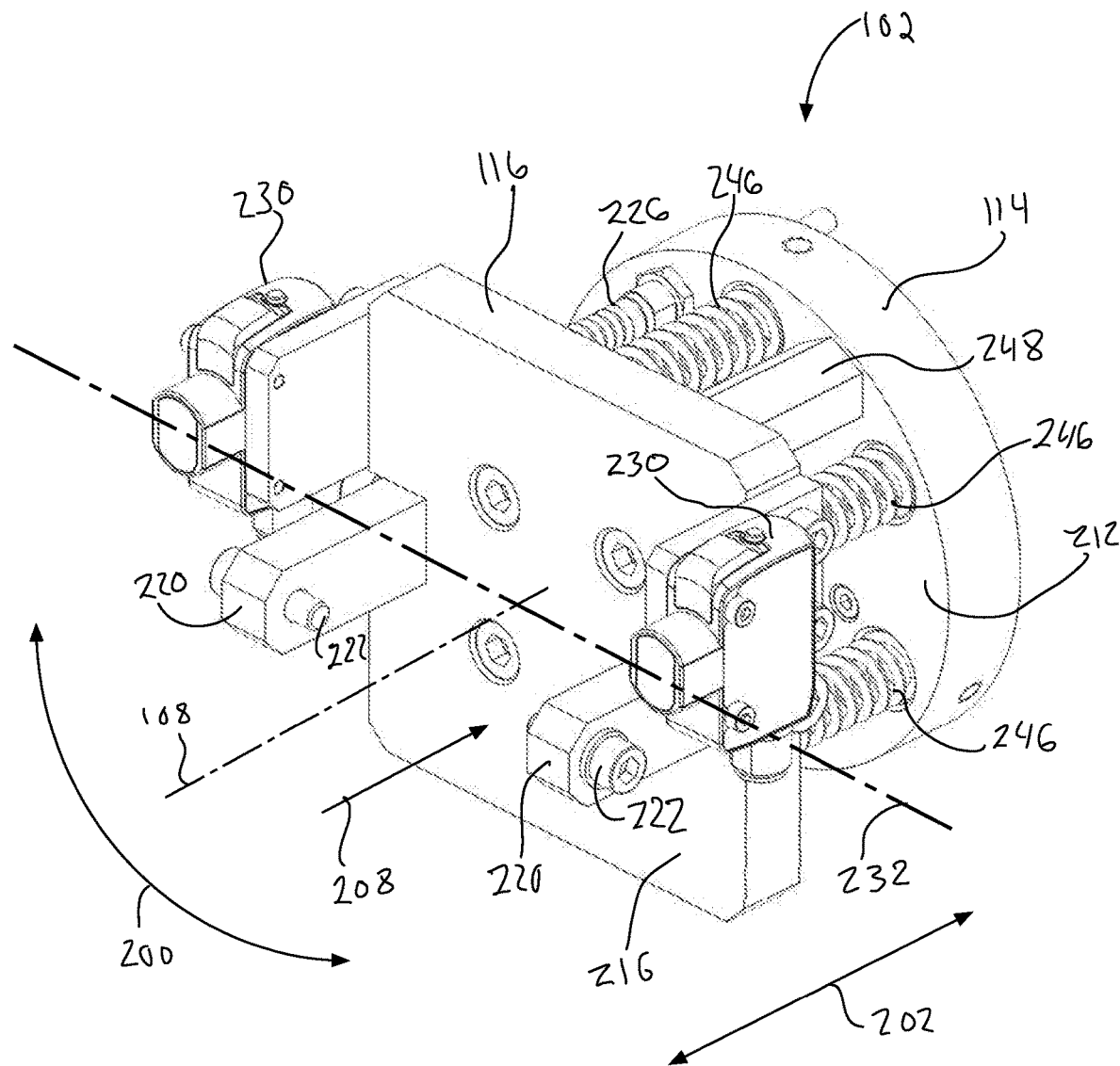
FIG. 7 is a schematic perspective end view of an example of the compliance wrist of the disclosed end effector.
Figure 8:
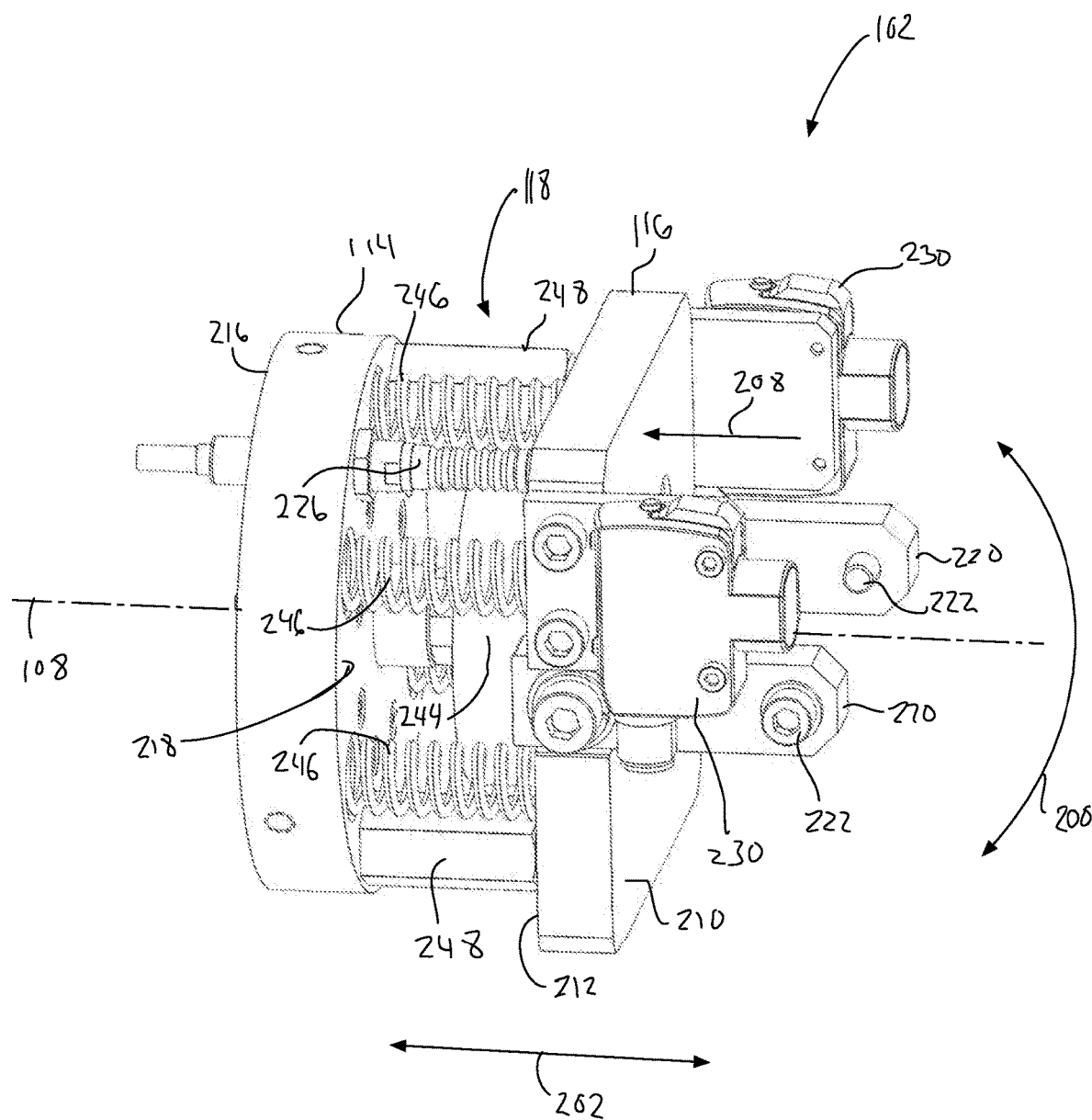
FIG. 8 is a schematic perspective side view of an example of the compliance wrist of the disclosed end effector.

Referring to FIGS. 6-8, the robot-mounting member 114 includes a first side 210 and an opposed second side 212. The axis of movement 108 of the compliance wrist 104 and the center axis 204 (FIG. 9) of the robot-mounting member 114 extend through the robot-mounting member 114 perpendicular to the first side 210 and the second side 212 of the robot-mounting member 114. The first side 210 of the robot-mounting member 114 is configured to mate with and engage the end 128 of the arm assembly 132 of the robot 102 (FIGS. 4 and 5). In an example, the compliance wrist 104 is fixed (e.g., removably coupled) to the end 128 of the arm assembly 132 of the robot 102 by a plurality of fasteners extending through the robot-mounting member 114 from the second side 212 to the first side 210 of the robot-mounting member 114. The movement assembly 118 is coupled to the second side 212 of the robot-mounting member 114.

The tool-supporting member 116 includes a first side 216 and an opposed second side 218. The axis of movement 108 of the compliance wrist 104 and the center axis 206 (FIG. 9) of the tool-supporting member 116 extend through the tool-supporting member 116 perpendicular to the first side 216 and the second side 218 of the tool-supporting member 116. The first side 216 of the tool-supporting member 116 is configured for mounting of the grinder tool 106 to the compliance wrist 104. The movement assembly 118 is coupled to the second side 218 of the tool-supporting member 116.

Referring to FIGS. 7 and 8, in an example, compliance wrist 104 includes at least one tool-mounting bracket 220. The tool-mounting bracket 220 is coupled to the tool-supporting member 116 and extends perpendicularly outward from the second side 218 of the tool-supporting member 116. The tool-mounting bracket 220 is configured to be coupled to the grinder tool 106. As an example, the tool-mounting bracket 220 includes a fastener 222 projecting perpendicularly from the tool-mounting bracket 220 and configured to be secured within a mounting aperture 224 (FIG. 5) in at least one side of the grinder tool 104. In the illustrative examples, the compliance wrist 104 includes two laterally opposed tool-mounting brackets 220 configured to be coupled to laterally opposed mounting apertures 224 on both sides of the grinder tool 106.

Referring to FIGS. 6-10, in an example, the end effector 126 also includes a switch 226 coupled to the compliance wrist 104. The switch 226 is configured to actuate (e.g., energize) the grinder tool 106 in response to the movement (e.g., linear movement and/or pivotal movement) of the grinder tool 106 along or about the axis of movement 108 of the compliance wrist 104 relative to the robot 102. As an example, the switch 226 is configured to actuate the grinder tool 106 in response to linear movement of the tool-supporting member 116 along the axis of movement 108 of the compliance wrist 104 relative to the robot-mounting member 114 and/or in response to pivotal movement of the tool-supporting member 116 about the axis of movement 108 of the compliance wrist 104 relative to the robot-mounting member 114. The switch 226 may also be configured to actuate the vacuum 182 of the dust collector 178 (FIGS. 2 and 3).

The switch 226 may be any suitable two-position switch configured to be communicatively coupled with the controller 144 (FIG. 2) of the robot 102 to control operation of the grinder tool 106. As an example, the switch 226 is a contact switch configured to perform the switch function by mechanically switching contact points. In an example, the switch 226 is coupled to the robot-mounting member 114 and projects perpendicularly from the second side 212 of the robot-mounting member 114 toward the second side 218 of the tool-supporting member 116. An operational component 228 of the switch 226 (e.g., a push-button) is located an end of the switch 226 opposite the robot-mounting member 114. The operational component 228 is positioned proximate to, but is spaced away from, the second side 218 of the tool-supporting member 116. When the tool-supporting member 116 linearly moves along the axis of movement 108 of the compliance wrist 104 toward the robot-mounting member 116 and/or pivotally moves about the axis of movement 108 of the compliance wrist 104 relative to the robot-mounting member 116 (e.g., in response to the external force), the tool-supporting member 116 engages the operational component 228 (e.g., depresses the push-button) to cause operation of the grinder tool 106. As an example, the switch 226 is a normally open switch so that the grinder tool 106 operates only while the switch 226 is actively engaged by the tool-supporting member 116 (e.g., only while the push-button of the switch 226 is depressed).

In an example, the end effector 126 also includes at least one surface sensor 230 coupled to the compliance wrist 104. The surface sensor 230 is configured to sense (e.g., detect or otherwise measure) a surface height of the concrete surface 302 (FIGS. 1 and 2). As an example, the surface sensor 230 is configured to measure the distance between the concrete surface 302 and the end effector 126. For example, the surface sensor 230 is configured to sense the height of the concrete surface 302 relative to a fixed point on the compliance wrist 104 (e.g., a fixed position of the surface sensor 230). The distance between the concrete surface 302 and the surface sensor 230 indicates the height of the concrete surface 302, which indicates the seam 306 projecting from the concrete surface 302.

In the illustrative examples, the end effector 126 includes two surface sensors 230 coupled to the compliance wrist 104. In an example, the surface sensors 230 are mounted to the tool-supporting member 116 outside of the grinder tool 106 (FIG. 4). The two surface sensors 230 are aligned with each other in the direction of travel on opposite sides of the compliance wrist 104. As an example, the surface sensors 230 are aligned along an axis of travel 232 (FIG. 7) of the end effector 126. The axis of travel 232 of the end effector 126 extends perpendicular to the axis of movement 108 of the compliance wrist 108 and defines the direction of travel of the end effector 126 during the surface finishing operation. In an example, the axis of travel 232 extends across a working surface 234 of the surface finishing attachment 146.

As an example, during the surface finishing operation, the robot 102 positions the end effector 126 so that the axis of travel 232 is substantially aligned with the seam 306, projecting outward from the concrete surface 302 (FIGS. 1 and 2), and the working surface 234 of the surface finishing attachment 146 of the grinder tool 106 is in contact with the seam 306. The robot 102 may control an angular orientation of the axis of travel 232 of the end effector 126 to align the axis of travel 232 with the seam 306 by rotating the end effector 126 about the centerline of the arm segment 140 to which is it attached. The robot 102 controllably moves the end effector 126 along the seam 306 in one of two opposing linear directions of travel as defined by the axis of travel 232.

Accordingly, in examples of the end effector 126 that include two surface sensors 230, during the surface finishing operation, one of the two surface sensors 230 is located at a rearward end of the compliance wrist 104, referred to generally as the rearward one of the surface sensors 230, and the opposite one of the two surface sensors 230 is located at a forward end of the compliance wrist 104, referred to generally as a forward one of the surface sensors 230. As used herein, the terms "rearward" and "forward" are used with respect to the direction of travel. Use of the two surface sensors 230 enables the end effector 126 to move back and forth along the seam 306 (FIGS. 1 and 2) without the need to adjust the angular orientation of the end effector 126.

As the end effector 126 travels along the seam 306 (FIGS. 1 and 2), the rearward one of the surface sensors 230 measures the height of the concrete surface 302 (FIGS. 1 and 2) after grinding the seam 306. Height changes remaining in the concrete surface 302 after grinding the seam 306 indicate that the seam 306 has not been sufficiently ground out (e.g., the seam 306 is not flush with the portion of the concrete surface 302 surrounding the seam 306), for example, within a tolerance of approximately 1 mm. As an example, height changes remaining in the concrete surface 302 after grinding the seam 306 are transmitted via the rearward one of the surface sensors 230 to the controller 144 (FIG. 2), and the direction of travel of the end effector 126 is reversed so that the grinder tool 106 passes over that location again.

Optionally, in an example, the forward one of the surface sensors 230 may measure the height of the concrete surface 302 before grinding the seam 306 (FIGS. 1 and 2). In this example, the height of the concrete surface 302 after grinding the seam 302 may be compared to the height of the concrete surface 302 before grinding the seam 302 and the comparison of the two measured heights may be used to indicate whether the seam 306 has been sufficiently ground out. Additionally, in this example, a location of the height changes in the concrete surface 302 before grinding the seam 306 may optionally be used to automatically control the position of the end effector 126 relative to the seam 306 so that the axis of travel 232 of the end effector 126 is aligned with the seam 306 and the working surface 234 of the surface finishing attachment 146 of the grinder tool 104 remains in contact with the seam.

In an example, the surface sensor 230 includes a laser sensor configured to project a laser beam. The laser beam is directed at the concrete surface 302 (FIGS. 1 and 2) for measuring the height of the concrete surface 302. As an example, the surface sensor 230 projects a laser pulse having a predetermined shape or pattern (e.g., a spot beam, a narrow beam, etc.) towards an area of the concrete surface 302 extending across the seam 306. The surface sensor 230 measures the time taken by the pulse to be reflected off of the concrete surface 302 and returned to the surface sensor 230. The surface sensor 230 then calculates the height at different locations on the concrete surface 302 as the difference between the return times at those different locations on the concrete surface 302. The surface sensor 230 may be selected from a variety of commercially available laser distance sensors.

In other examples, the surface sensor 230 may be other types of non-contact sensors such as an ultrasonic sensor, a radar sensor, and the like. In yet other examples, the surface sensor 230 may be a contact sensor such as a mechanical transducer, a roller, a lever arm, and the like.

Referring to FIGS. 4 and 5, in an example, the end effector 126 also includes an air monitor 240 coupled to the compliance wrist 104 proximate to the grinder tool 106. The air monitor 240 is configured to monitor exposure limits of respirable crystalline silica dust in the air before, during, and/or after the surface finishing operation. In an example, the air monitor 240 is configured to measure silica exposure levels in the air in real-time. In another example, the air monitor 240 is configured to measure and record silica exposure levels in the air. In an example, the air monitor 240 is configured to generate an alarm in response to silica levels reaching or exceeding a preset exposure limit. The air monitor 240 may be selected from a variety of commercially available air-monitoring devices.

Figure 9:
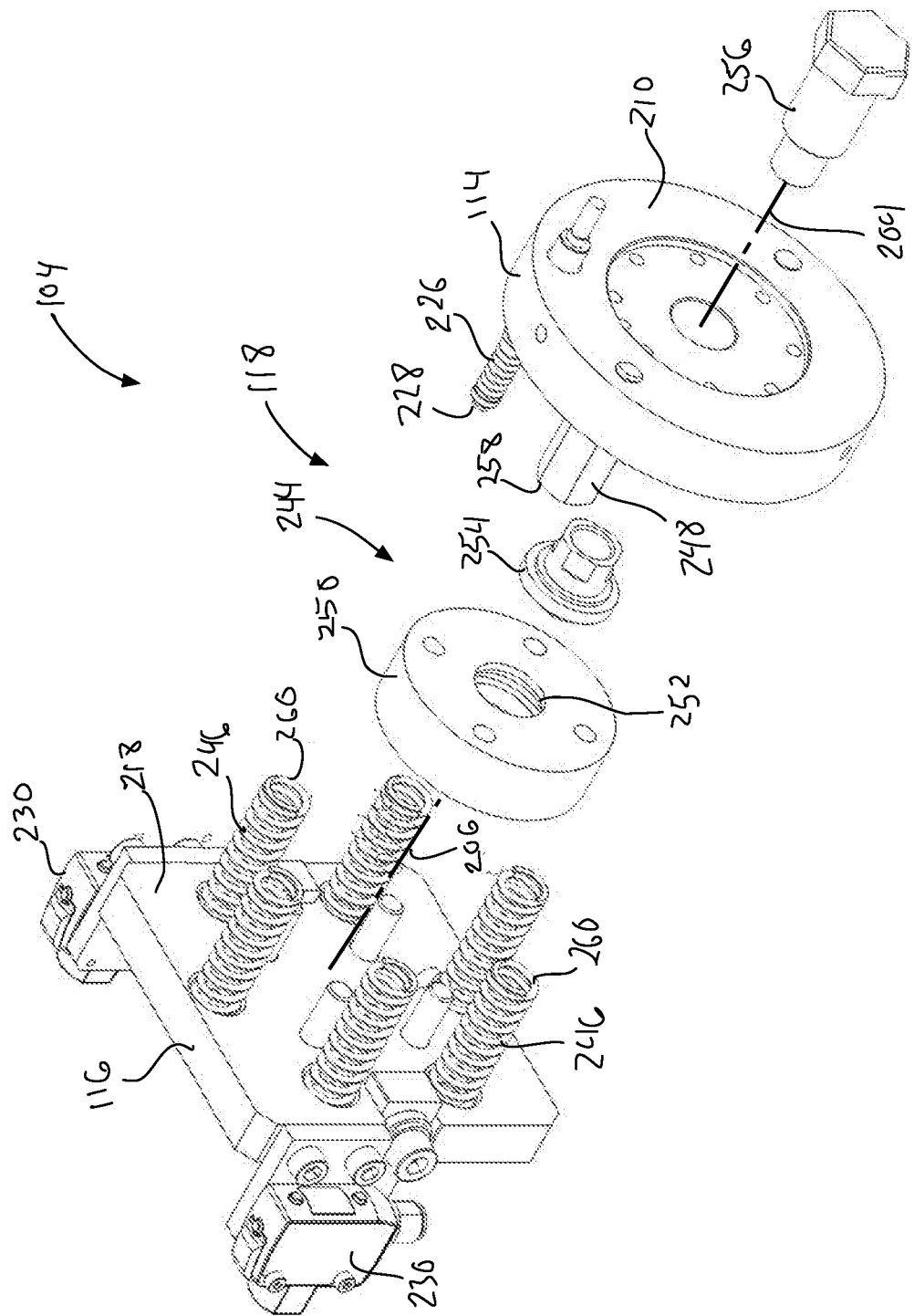
FIG. 9 is a schematic exploded perspective view of an example of the compliance wrist of the disclosed end effector.
Figure 10:
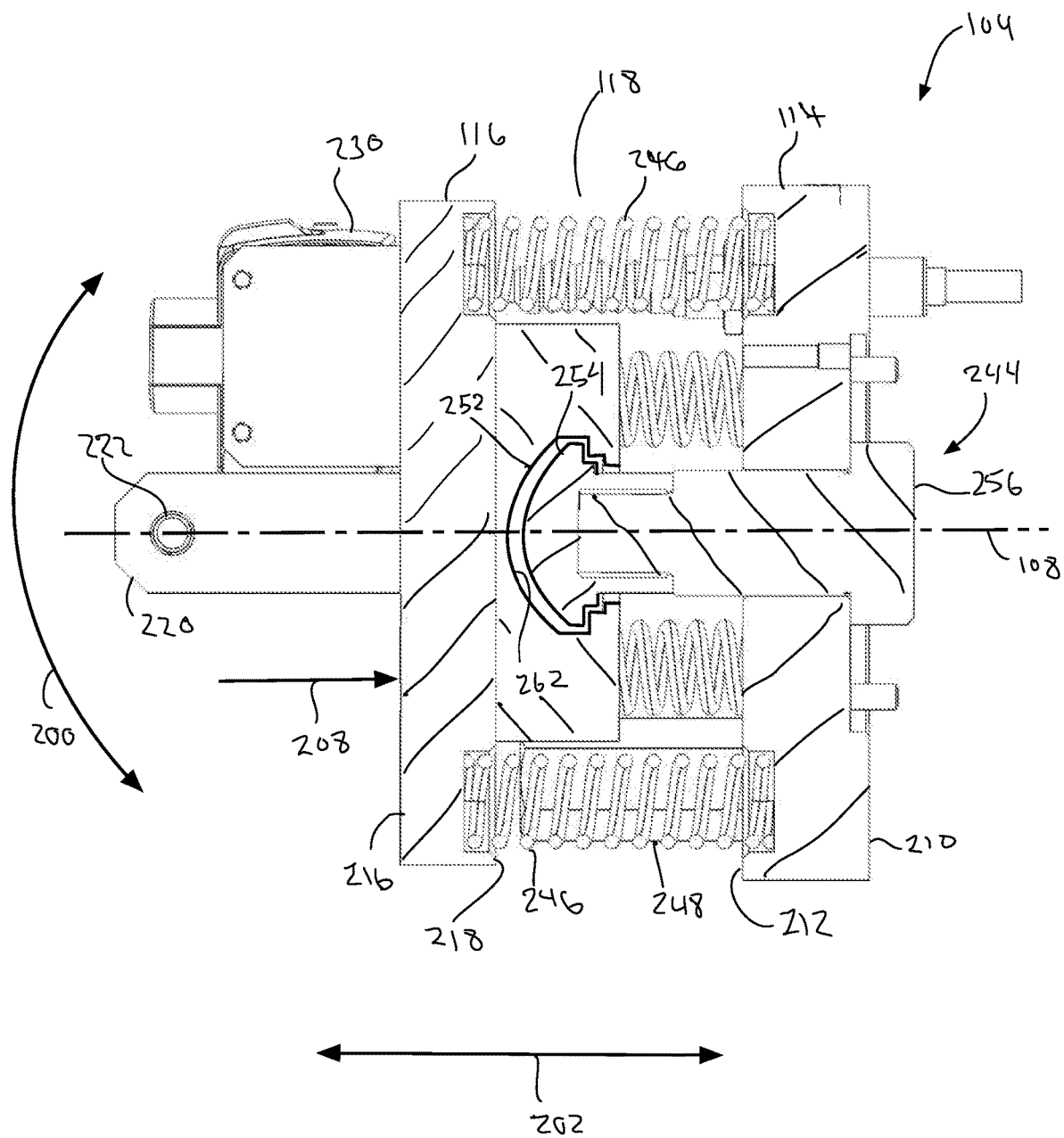
FIG. 10 is a schematic side view, in section, of an example of the compliance wrist of the disclosed end effector.

Referring to FIGS. 9 and 10, in an example, the movement assembly 118 includes a ball-and-socket joint 244 coupling the tool-supporting member 116 with the robot-mounting member 114. The ball-and-socket joint 244 enables movement of the tool-supporting member 116 relative to the robot-mounting member 114. The movement assembly 118 also includes a plurality of biasing elements 246 extending between the robot-mounting member 114 and the tool-supporting member 116. The plurality of biasing elements 246 biases the tool-supporting member 116 relative to the robot-mounting member 114. The movement assembly 118 includes a plurality of movement-limiting elements 248 projecting outward from the robot-mounting member 114. The at least two movement-limiting elements 248 limit movement of the tool-supporting member 116 relative to the robot-mounting member 114.

In an example, the ball-and-socket joint 144 is configured to enable the tool-supporting member 116 to pivotally move about the axis of movement 108 of the compliance wrist 104 relative to the robot-mounting member 114. The ball-and-socket joint 144 is also configured to enable the tool-supporting member 116 to linearly move along the axis of movement 108 of the compliance wrist 104 relative to the robot-mounting member 114. The ball-and-socket joint 144 is also configured to limit linear movement of the tool-supporting member 116 along the axis of movement 108 of the compliance wrist 104 away from the robot-mounting member 114.

In an example, the ball-and-socket joint 144 includes a joint casing 250 coupled to the second side 218 of the tool-supporting member 116. The joint casing 250 includes a socket 252 positioned coaxial with the center axis 206 (FIG. 10) of the tool-supporting member 116. The ball-and-socket joint 144 also includes a joint ball 254 that is movably coupled with the joint casing 250. The joint ball 254 is configured to fit within the socket 252 and to sit in a seat 262 (FIG. 10) of the joint casing 250 formed by the socket 252. The ball-and-socket joint 144 also includes an arm 256 coupled to the joint ball 254 and coupled to the robot-mounting member 114. The arm 256 projects outward from the second side 212 of the robot-mounting member 114 and is positioned coaxial with the center axis 204 of the robot-mounting member 114 and the axis of movement 108 of the compliance wrist 104.

The arm 256 and the joint ball 254 are fixed relative to the robot-mounting member 114. Pivotal movement of the joint casing 250 about the axis of movement 108 of the compliance wrist 108 relative to the joint ball 254 enables pivotal movement of the tool-supporting member 116 about the axis of movement 108 of the compliance wrist 108 relative to the robot-mounting member 114. Axial displacement of the joint casing 250 along the axis of movement 108 of the compliance wrist 108 relative to the joint ball 254 enables linear movement of the tool-supporting member 116 along the axis of movement 108 of the compliance wrist 108 relative to the robot-mounting member 114.

In an example, the plurality of biasing elements 246 is configured to pivotally bias the tool-supporting member 116 to the pivotally biased position about the axis of movement 108 of the compliance wrist 104 relative to the robot-mounting member 114. The plurality of biasing elements 246 is also configured to linearly bias the tool-supporting member 116 to the linearly biased position along the axis of movement 108 of the compliance wrist 104 away from the robot-mounting member 114. The plurality of biasing elements 246 is also configured to restrict rotational movement of the tool-supporting member 116 about the axis of movement 108 of the compliance wrist 104 relative to the robot-mounting member 114.

In the illustrative examples, the plurality of biasing elements 246 includes six biasing elements 246. However, in other examples, less than six or more than six biasing elements 246 may be used.

In an example, one or more of the plurality of biasing elements 246 includes a helical coil spring 260 (FIG. 9). In another example, one or more of the plurality of biasing elements 246 includes an air cylinder. The biasing elements 246 may include other types of biasing mechanisms.

In an example, the plurality of movement-limiting elements 248 is configured to limit pivotal movement of the tool-supporting member 116 about the axis of movement 108 of the compliance wrist 104 relative to the robot-mounting member 114. The plurality of movement-limiting elements 248 is also configured to limit linear movement of the tool-supporting member 116 along the axis of movement 108 of the compliance wrist 104 toward the robot-mounting member 114.

In the illustrative examples, the plurality of movement-limiting elements 248 includes two movement-limiting elements 248. In this example, the two movement-limiting elements 248 are directly opposite one another. However, in other examples, more than two movement-limiting elements 248 may be used. In examples of the compliance wrist 104 that include three or more movement-limiting elements 248, each one of the movement-limiting elements 248 is equally spaced apart from its pair of adjacent movement-limiting elements 248.

In an example, one or more of the movement-limiting elements 248 includes a post 258 (FIG. 9) or similar rigid structure fixed to the robot-mounting member 114. The post 258 extends from the second side 212 of the robot-mounting member 114 parallel to the center axis 204 of the robot-mounting member 114 and the axis of movement 108 of the compliance wrist 104. An end of the post 258 is positioned proximate to, but is spaced away from, the second side 212 of the tool-supporting member 116.

In an example, upon the tool-supporting member 116 reaching a maximum angular displacement, during pivotal movement of the tool-supporting member 116 about the axis of movement 108 of the compliance wrist 104 relative to the robot-mounting member 114, contact of the tool-supporting member 116 with at least one of the movement-limiting elements 248 limits further angular displacement of the tool-supporting member 116. As an example, the maximum angular displacement of the tool-supporting member 116 is approximately 15 degrees. As another example, the maximum angular displacement of the tool-supporting member 116 is approximately 10 degrees. As yet another example, the maximum angular displacement of the tool-supporting member 116 is approximately 5 degrees.

In an example, upon the tool-supporting member 116 reaching a maximum axial displacement, during linear movement of the tool-supporting member 116 along the axis of movement 108 of the compliance wrist 104 relative to (e.g., toward) the robot-mounting member 114, contact of the tool-supporting member 116 with at least one of the movement-limiting elements 248 limits further axial displacement of the tool-supporting member 116. As an example, the maximum axial displacement of the tool-supporting member 116 is approximately 5 mm. As another example, the maximum axial displacement of the tool-supporting member 116 is approximately 2 mm. As yet another example, the maximum axial displacement of the tool-supporting member 116 is approximately 1 mm.

Figure 11:
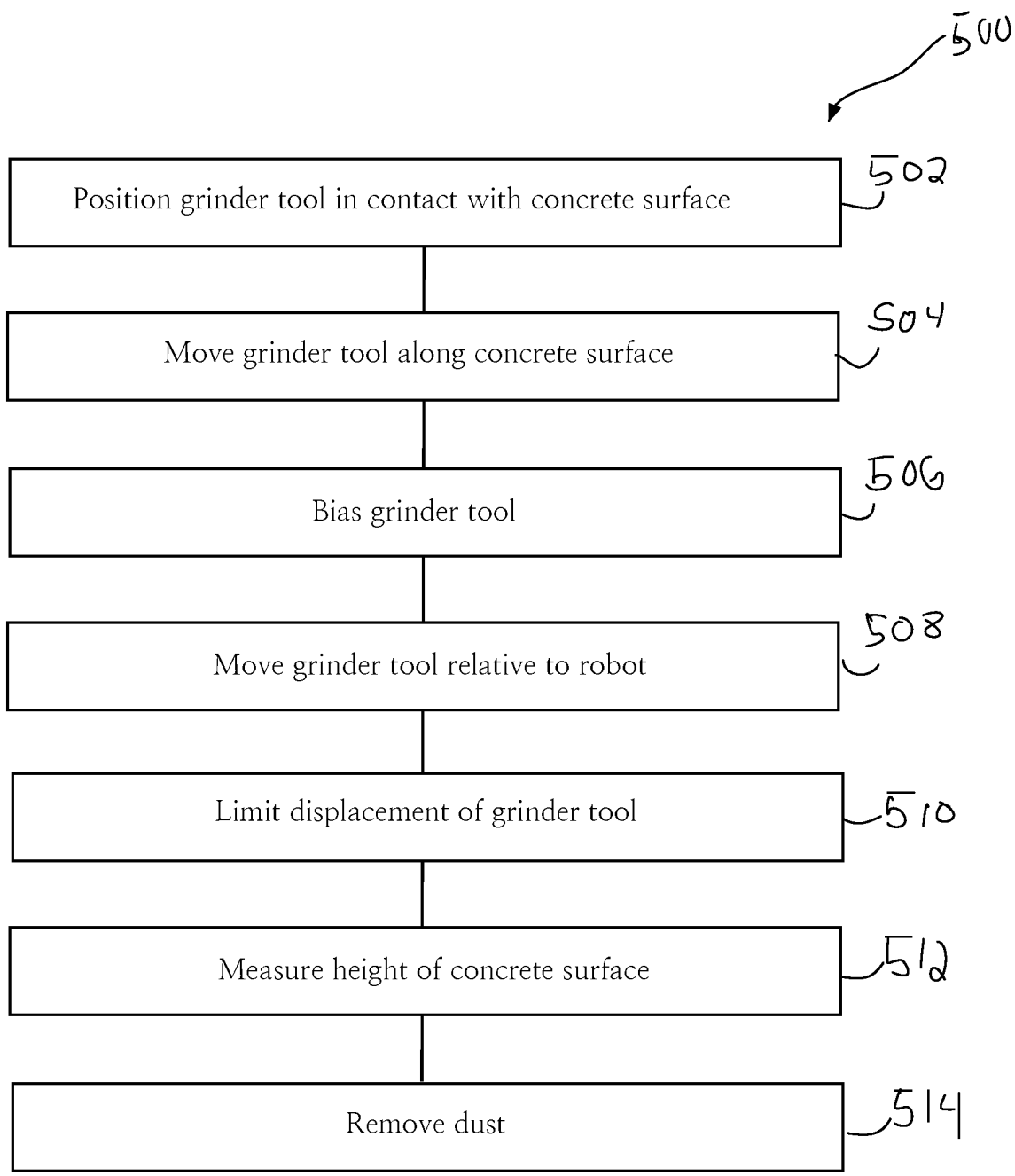
FIG. 11 is a flow diagram of an example of the disclosed method for surface finishing.

Referring to FIG. 11, an example of the disclosed method 500 for surface finishing the concrete surface 302 begins with the grinder tool being positioned in contact with the concrete surface 302, as shown at block 502. In an example, the grinder tool is positioned in contact with the seam 306 projecting outward from the concrete surface 302. This positioning step is achieved using the boom lift vehicle 156 to position the robot 102 relative to the concrete structure 300 and using the robot 102 to position the end effector 126 relative to the concrete surface 302.

As shown at block 504, the grinder tool 106 is moved along the concrete surface 302 to smooth the concrete surface 302. This moving step is achieved using the robot 102 to move the end effector 126 along a travel path. In an example, the grinder tool 106 is moved along the seam 306 to grind out the seam 306. In an example, the travel path of the grinder tool 106 is programmed so that the robot 102 automatically moves the grinder tool 106 along the travel path.

As shown at block 506, the grinder tool 106 is biased to at least one of the pivotally biased position and the linearly biased position relative to the robot 102 with the compliance wrist 104. In an example, pivotally biasing and linearly biasing the position of the grinder tool 106 maintains the grinder tool 106 in contact with the concrete surface 302 during the surface finishing operation and as the seam 306 is ground down flush with the concrete surface 302.

As shown at block 508, with the compliance wrist 104, the grinder tool 106 is at least one of pivotally moved about the axis of movement 108 of the compliance wrist 104 relative to the robot 102 and linearly moved along the axis of movement 108 relative to the robot in response to the concrete surface 302 pushing against the grinder tool 106. In an example, the linearly moving of the grinder tool 106 toward the robot 102 actuates operation of the grinder tool 106. In an example, pivotally moving of the grinder tool 106 relative to the robot 102 enables the surface finishing attachment 146 of the grinder tool 106 to adjust its angular orientation relative to the concrete surface 302 as the seam 306 is being ground down.

As shown at block 510, with the compliance wrist 104, at least one of the angular displacement and/or the axial displacement of the grinder tool 106 relative to the robot 102 is limited.

As shown at block 512, with the surface sensor 230, the height of the concrete surface 302 and/or the seam 306 relative to the concrete surface 302 is measured after grinding down the seam 306 and, optionally, before the seam 306 is ground down.

As shown at block 514, with the duct collector 178, dust and other debris created by the grinder tool 106 during the surface finishing operation are removed.

While the examples of the apparatus 100, end effector 126, and method 500 disclosed herein are described in relation to the surface finishing operation of the concrete surface 302 of the concrete structure 300 and, more particularly, to grinding down the seam 306 projecting from the concrete surface 302, the disclosed apparatus 100, end effector 126, and method 500 may find equal use and benefit in relation to surface finishing operations performed on structures and surfaces made out of various other materials.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

As used herein, the terms "partially" or "at least a portion of" may represent an amount of a whole that includes an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

As used herein, the term "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted may also exist.

In FIG. 11, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 11 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples and embodiments of the disclosed apparatus, end effector, and method have been shown and described, modifications may occur to those skilled in the art upon reading the specification. The present application includes such modifications and is limited only by the scope of the claims.

What is claimed is:

1. An apparatus for surface finishing, said apparatus comprising:
  a robot; and
  an end effector comprising:
    a compliance wrist having an axis of movement and comprising:
      a robot-mounting member coupled to an end of said robot;
      a tool-supporting member coupled to said grinder tool; and
      a movement assembly movably coupling said tool-supporting member with said robot-mounting member and biasing said tool-supporting member to a biased position relative to said robot-mounting member;
    a switch coupled to said compliance wrist; and
    a grinder tool coupled to said compliance wrist; and
  wherein:
  said robot is configured to controllably position said end effector in three-dimensional space;
  said compliance wrist is configured to:
    bias the grinder tool to a biased position relative to said robot; and
    enable said grinder tool to move relative to said robot in response to an external force acting upon said grinder tool; and
  said switch is configured to actuate said grinder tool in response to at least one of linear movement of said tool-supporting member along said axis of movement and pivotal movement of said tool-supporting member about said axis of movement.

2. The apparatus of claim 1, wherein said compliance wrist is further configured to:
  pivotally bias said grinder tool to a pivotally biased position about said axis of movement relative to said robot; and
  enable said grinder tool to pivotally move about said axis of movement relative to said robot in response to said external force acting upon said grinder tool.

3. The apparatus of claim 1, wherein said compliance wrist is configured to:
  linearly bias said grinder tool to a linearly biased position along said axis of movement relative to said robot; and
  enable said grinder tool to linearly move along said axis of movement relative to said robot in response to said external force acting upon said grinder tool.

4. The apparatus of claim 1, wherein said movement assembly is configured to:
  pivotally bias said tool-supporting member to a pivotally biased position about said axis of movement relative to said robot-mounting member; and
  enable said tool-supporting member to pivotally move about said axis of movement relative to said robot-mounting member in response to an external force acting upon said tool-supporting member.

5. The apparatus of claim 1, wherein said movement assembly is configured to:

linearly bias said tool-supporting member to a linearly biased position along said axis of movement relative to said robot-mounting member; and
enable said tool-supporting member to linearly move along said axis of movement relative to said robot-mounting member in response to said external force acting upon said tool-supporting member.

6. The apparatus of claim 1, wherein said movement assembly comprises:
a ball-and-socket joint coupling said tool-supporting member with said robot-mounting member, wherein said ball-and-socket joint enables movement of said tool-supporting member relative to said robot-mounting member;
a plurality of biasing elements extending between said robot-mounting member and said tool-supporting member, wherein said plurality of biasing elements biases said tool-supporting member relative to said robot-mounting member; and
at least two movement-limiting elements projecting outward from said robot-mounting member, wherein said at least two movement-limiting elements limit movement of said tool-supporting member relative to said robot-mounting member.

7. The apparatus of claim 6, wherein said ball-and-socket joint is configured to:
enable said tool-supporting member to pivotally move about said axis of movement relative to said robot-mounting member;
enable said tool-supporting member to linearly move along said axis of movement relative to said robot-mounting member; and
limit linear movement of said tool-supporting member along said axis of movement away from said robot-mounting member.

8. The apparatus of claim 7, wherein said plurality of biasing elements is configured to:
pivotally bias said tool-supporting member to a pivotally biased position about said axis of movement relative to said robot-mounting member;
linearly bias said tool-supporting member to a linearly biased position along said axis of movement away from said robot-mounting member; and
restrict rotational movement of said tool-supporting member about said axis of movement relative to said robot-mounting member.

9. The apparatus of claim 8, wherein said at least two movement-limiting elements are configured to:
limit pivotal movement of said tool-supporting member about said axis of movement relative to said robot-mounting member; and
limit linear movement of said tool-supporting member along said axis of movement toward said robot-mounting member.

10. The apparatus of claim 1, wherein said end effector further comprises a surface sensor coupled to said compliance wrist, and wherein said surface sensor is configured to sense a seam projecting from a surface.

11. The apparatus of claim 1, wherein said end effector further comprises an air monitor coupled to said compliance wrist, and wherein said air monitor is configured to measure an exposure level of respirable crystalline silica dust.

12. The apparatus of claim 1, further comprising a dust collector comprising:
a shroud coupled to said grinder tool, said shroud having a vacuum port;
a duct communicatively coupled to said vacuum port of said shroud; and
a vacuum communicatively coupled to said duct.

13. The apparatus of claim 1, further comprising a boom lift vehicle comprising:
a vehicle base;
a boom assembly movably coupled to said vehicle base; and
a platform coupled to said boom assembly, wherein said robot is mounted on said platform.

14. An apparatus for surface finishing, said apparatus comprising:
a robot; and
an end effector comprising:
a compliance wrist having an axis of movement and coupled to said robot;
a grinder tool coupled to said compliance wrist; and
an air monitor coupled to said compliant wrist; and
wherein:
said robot is configured to controllably position said end effector in three-dimensional space;
said compliance wrist is configured to:
bias the grinder tool to a biased position relative to said robot; and
enable said grinder tool to move relative to said robot in response to an external force acting upon said grinder tool; and
said air monitor is configured to measure an exposure level of respirable crystalline silica dust.

15. The apparatus of claim 14, wherein said compliance wrist is further configured to:
at least one of pivotally bias said grinder tool to a pivotally biased position about said axis of movement relative to said robot and linearly bias said grinder tool to a linearly biased position along said axis of movement relative to said robot; and
at least one of enable said grinder tool to pivotally move about said axis of movement relative to said robot in response to said external force acting upon said grinder tool and enable said grinder tool to linearly move along said axis of movement relative to said robot in response to said external force acting upon said grinder tool.

16. The apparatus of claim 15, wherein said end effector further comprises a switch coupled to said compliance wrist, and wherein said switch is configured to actuate said grinder tool in response to at least one of linear movement of said grinder tool along said axis of movement and pivotal movement of said grinder tool about said axis of movement.

17. An apparatus for surface finishing, said apparatus comprising:
a robot; and
a compliance wrist having an axis of movement and comprising:
a robot-mounting member coupled to an end of said robot;
a ball-and-socket joint coupled to said robot-mounting member;
a tool-supporting member coupled to said ball-and-socket joint, wherein said ball-and-socket joint enables movement of said tool-supporting member relative to said robot-mounting member;
a plurality of biasing elements extending between said robot-mounting member and said tool-supporting member, wherein said plurality of biasing elements biases said tool-supporting member relative to said robot-mounting member; and at least two movement-limiting elements projecting outward from said robot-mounting member, wherein said at least two movement-limiting elements limit movement of said tool-supporting member relative to said robot-mounting member; and wherein:

said tool-supporting member of said compliance wrist is configured to be coupled to a grinder tool;

said robot is configured to controllably position said grinder tool, coupled to said tool-supporting member, in three-dimensional space; and said compliance wrist is configured to:
bias the grinder tool to a biased position relative to said robot; and
enable said grinder tool to move relative to said robot in response to an external force acting upon said grinder tool.

18. The apparatus of claim 17, wherein said compliance wrist is further configured to:
pivotally bias said tool-supporting member to a pivotally biased position about said axis of movement relative to said robot-mounting member; and
enable said tool-supporting member to pivotally move about said axis of movement relative to said robot-mounting member in response to said external force acting upon said grinder tool.

19. The apparatus of claim 17, wherein said compliance wrist is configured to:
linearly bias said tool-supporting member to a linearly biased position along said axis of movement relative to said robot-mounting member; and
enable said tool-supporting member to linearly move along said axis of movement relative to said robot-mounting member in response to said external force acting upon said grinder tool.

20. The apparatus of claim 17, further comprises a switch coupled to said compliance wrist, wherein said switch is configured to actuate said grinder tool in response to at least one of linear movement of said tool-supporting member along said axis of movement and pivotal movement of said tool-supporting member about said axis of movement.

* * * * *